(12) United States Patent
Kawata et al.

(10) Patent No.: US 9,294,704 B2
(45) Date of Patent: Mar. 22, 2016

(54) IMAGE CAPTURING APPARATUS AND IMAGE CAPTURING METHOD (71) Applicant: FUJI XEROX CO., LTD., Tokyo (JP)

(72) Inventors: Yuichi Kawata, Kanagawa (JP); Nobuaki Suzuki, Kanagawa (JP); Hideki Yamasaki, Kanagawa (JP); Tomitsugu Koseki, Kanagawa (JP); Yoshifumi Bando, Kanagawa (JP); Kensuke Okamoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/616,171

(22) Filed: Feb. 6, 2015

(65) Prior Publication Data
US 2015/0271484 A1 Sep. 24, 2015

(30) Foreign Application Priority Data

Mar. 20, 2014 (JP) .................................. 2014-057933

(51) Int. Cl.
*H04N 5/44* (2011.01)
*H04L 7/00* (2006.01)
*H04L 1/00* (2006.01)
*G06F 11/07* (2006.01)
*H04N 1/32* (2006.01)
*H04N 17/00* (2006.01)

(52) U.S. Cl.
CPC .......... *H04N 5/4401* (2013.01); *G06F 11/0763* (2013.01); *H04L 1/0079* (2013.01); *H04L 7/0016* (2013.01); *H04N 1/32128* (2013.01); *H04N 1/32667* (2013.01); *H04N 17/002* (2013.01)

(58) Field of Classification Search
CPC ............ H04N 1/32667; H04N 7/0352; H04N 7/0357; H04N 5/00; H04N 1/00; G06F 11/0733; G06F 11/00; H04L 7/0066; H04L 1/00; H04L 7/00
See application file for complete search history.

(56) References Cited

U.S. PATENT DOCUMENTS

2012/0120289 A1* 5/2012 Sugioka ................ G06T 1/0007
348/294

FOREIGN PATENT DOCUMENTS

JP S63164682 A 7/1988

* cited by examiner

*Primary Examiner* — Paul Berardesca
(74) *Attorney, Agent, or Firm* — Oliff PLC (57) ABSTRACT

An image capturing apparatus includes an input unit, a detecting unit, and a controller. The input unit continuously inputs a signal sequence. The signal sequence includes values of multiple pixels and control information. The pixels constitute an image. The control information is embedded at multiple positions according to a rule. The detecting unit detects occurrence of an error on the basis of the inputted control information. The controller interrupts the input performed by the input unit when the detected error is based on the control information embedded in a first region of the image, and continues the input when the detected error is based on the control information embedded in a second region.

5 Claims, 7 Drawing Sheets

| TYPE OF TIMING CODE | VALUE |
|---|---|
| CL2 | FF0000AB |
| CR2 | FF0000B6 |
| CL1 | FF000080 |
| CR1 | FF00009D |

IMAGE CAPTURING APPARATUS AND IMAGE CAPTURING METHOD

CROSS-REFERENCE TO RELATED APPLICATIONS

This application is based on and claims priority under 35 USC 119 from Japanese Patent Application No. 2014-057933 filed Mar. 20, 2014.

BACKGROUND (i) Technical Field

The present invention relates to an image capturing apparatus and an image capturing method.

(ii) Related Art

For image data which is continuously obtained by using a camera and which is sequentially stored in a storage device, a technique for achieving synchronization control by embedding signals in the image data according to a predetermined rule is known.

SUMMARY

According to one aspect of the invention, there is provided an image capturing apparatus including an input unit, a detecting unit, and a controller. The input unit continuously inputs a signal sequence. The signal sequence includes values of multiple pixels and control information. The pixels constitute an image. The control information is embedded at multiple positions according to a rule. The detecting unit detects occurrence of an error on the basis of the inputted control information. The controller interrupts the input performed by the input unit when the detected error is based on the control information embedded in a first region of the image, and continues the input when the detected error is based on the control information embedded in a second region.

BRIEF DESCRIPTION OF THE DRAWINGS

Exemplary embodiment of the present invention will be described in detail based on the following figures, wherein.

DETAILED DESCRIPTION

Figure 1:
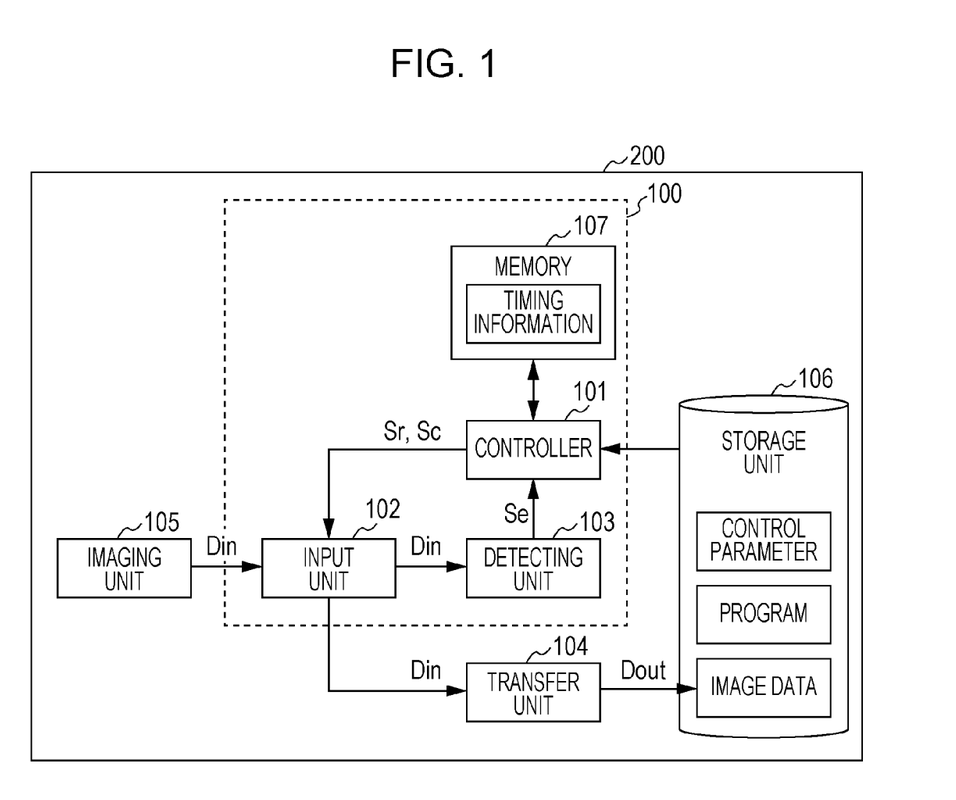
FIG. 1 is a diagram illustrating the functions of an image processing system.

FIG. 1 is a diagram illustrating the functions of an image processing system 200. The image processing system 200 which includes a signal processing module 100, an imaging unit 105, a transfer unit 104, and a storage unit 106 captures and stores images. The signal processing module 100 which includes a controller 101, an input unit 102, and a detecting unit 103 exerts control so that received images are transferred to (stored in) the storage unit 106.

The input unit 102 which is achieved by using an input interface, a clock circuit, a signal processing processor, and the like receives an input signal Din supplied continuously at predetermined timing from the imaging unit 105, at predetermined timing, and outputs it to the detecting unit 103 and the transfer unit 104. Specifically, the input unit 102 captures and transfers (or discards) data on the basis of a control signal supplied from the controller 101.

The detecting unit 103 which is a processor monitors whether or not the supplied input signal Din contains a timing code C. When the input signal Din contains a timing code C, the detecting unit 103 outputs an error detection signal Se representing this to the controller 101. The controller 101, the input unit 102, and the detecting unit 103 may be implemented as modules achieved by using a single processor, or may be implemented by using individual processors.

The transfer unit 104 is achieved by using a bus and a memory controller. The transfer unit 104 sequentially transfers the input signal Din received at predetermined timing as an output signal Dout in the unit according to the memory bus width (for example, 8 bits) to the storage unit 106, and stores the output signal Dout in a predetermined storage area.

The imaging unit 105 which is achieved by using an image sensor, an optical system, an image processing processor, a signal output interface, a signal cable, and the like photographs a subject, and supplies obtained image data to the input unit 102. This photographing operation may be continuously performed on a frame-by-frame basis (for example, 30 frames per second). One piece of image data is generated for one frame, and pieces of image data are sequentially outputted.

The storage unit 106 which is, for example, a semiconductor memory, such as a random-access memory (RAM) or a read-only memory (ROM), or a hard disk which temporarily or permanently stores information stores programs for controlling the controller 101, the output signal Dout outputted from the transfer unit 104, and control parameters referred to by the controller 101. The control parameters include information specifying the structure of received data and the input timing. The programs may be supplied to a user by storing them in a storage medium or through the Internet, and may be installed in a computer owned by the user.

The controller 101 is achieved by using a dedicated processor or a general-purpose processor. The controller 101 reads parameters necessary for control from the storage unit 106 when necessary, and outputs a control signal for control of capture timing and control of transfer to the transfer unit 104, to the input unit 102, thereby controlling the input unit 102. When the controller 101 is a general-purpose processor, the controller 101 activates the control programs from the storage unit 106 and executes them. Specifically, when an error detection signal Se is supplied from the detecting unit 103, the controller 101 supplies a signal Sr indicating an instruction to execute initialization or a signal Sc indicating an instruction to execute a recovery operation to the input unit 102.

The memory 107 which is a RAM stores a position at which the capture operation is being performed in a frame, and timing information representing a timing code C (described below) to be detected as next data. This information is updated by the controller 101 as appropriate.

Figure 2:
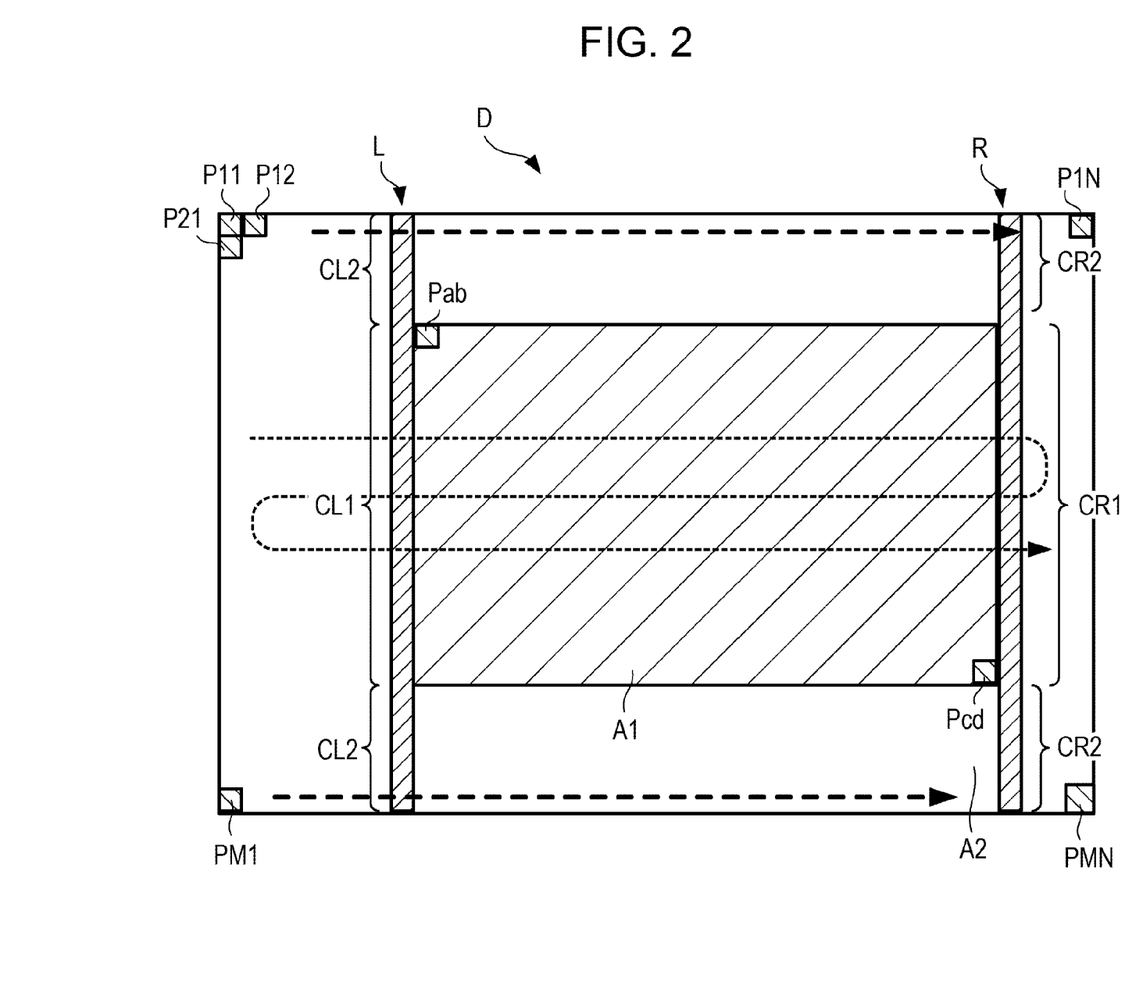
FIG. 2 is a diagram illustrating the structure of one piece of image data generated by an imaging unit.

FIG. 2 is a diagram illustrating an exemplary structure of image data D corresponding to one image obtained by the imaging unit 105. The image data D is aggregate data of M×N (M lines, N columns) matrix whose elements are unit data (referred to as data block). Therefore, the image data D includes data blocks, the number of which is equal to M×N. A data block "Pjk" indicates a data block located at the jth line and the kth column. The size of each of the data blocks P is the same (for example, 8 bits). Each of the data blocks P is a data block (data block Db or De) recognized as a pixel value which is an element of an image, or a data block (timing code C) inserted for control of data processing timing.

Data blocks De represent a captured image. For example, one data block De represents a pixel value which is an element of an image. Alternatively, one pixel value may correspond to multiple adjacent data blocks (data block group). A data block Db is information which is not directly related to information about a captured image, and is, for example, data having a predetermined value. Therefore, a data block Db is not a target to be transferred. Timing codes C are embedded for control, which is exerted by the signal processing module 100, of timing of processing the input signal Din, and have a value with which the timing codes C are distinguished from data blocks De and data blocks Db. Specifically, a timing code C is either one of CL1, CR1, CL2, and CR2.

The image data D contains a first region A1 and a second region A2. The first region A1 is constituted by data blocks Pab to Pcd, and has a rectangular shape of (c−a+1) lines and (d−b+1) columns. Timing codes C are disposed in each of at least one column L and at least one column R which belong to the second region A2 and which include boundary portions between the first region A1 and the second region A2. In the second region A2 other than the boundary portions, only data blocks Db are disposed. The second region A2 is an area other than the first region A1, and surrounds the first region A1. The first region A1 is constituted only by data blocks De.

Thus, the image data D for one frame represents an image itself, and has a structure in which data blocks De representing pixel values constituting an image and predetermined data blocks Db having a value irrelevant to the image itself are included, and in which, among these data blocks, data which represents synchronizing timing is embedded according to a predetermined rule. Each line needs to include two timing codes C.

For example, in ITU-656 (ITU-R BT.656) which describes transmission of a video signal, when YCC422 is employed as the format of image data, the total resolution of 858×525, the active resolution of 704×486, and the data bus width of 8 bit are used. Therefore, M=858, N=525, (d−b+1)=704, and (c−a+1)=486.

One data block De of 8-bit size represents either one of Cb (blue-luminance difference), Y (luminance), and Cr (red-luminance difference). Data blocks De are arranged in adjacent lines in the order of Cb, Y, Cr, Y, Cb, Y, Cr, etc. in the line direction. One pixel corresponds to two adjacent data blocks.

Figure 3:
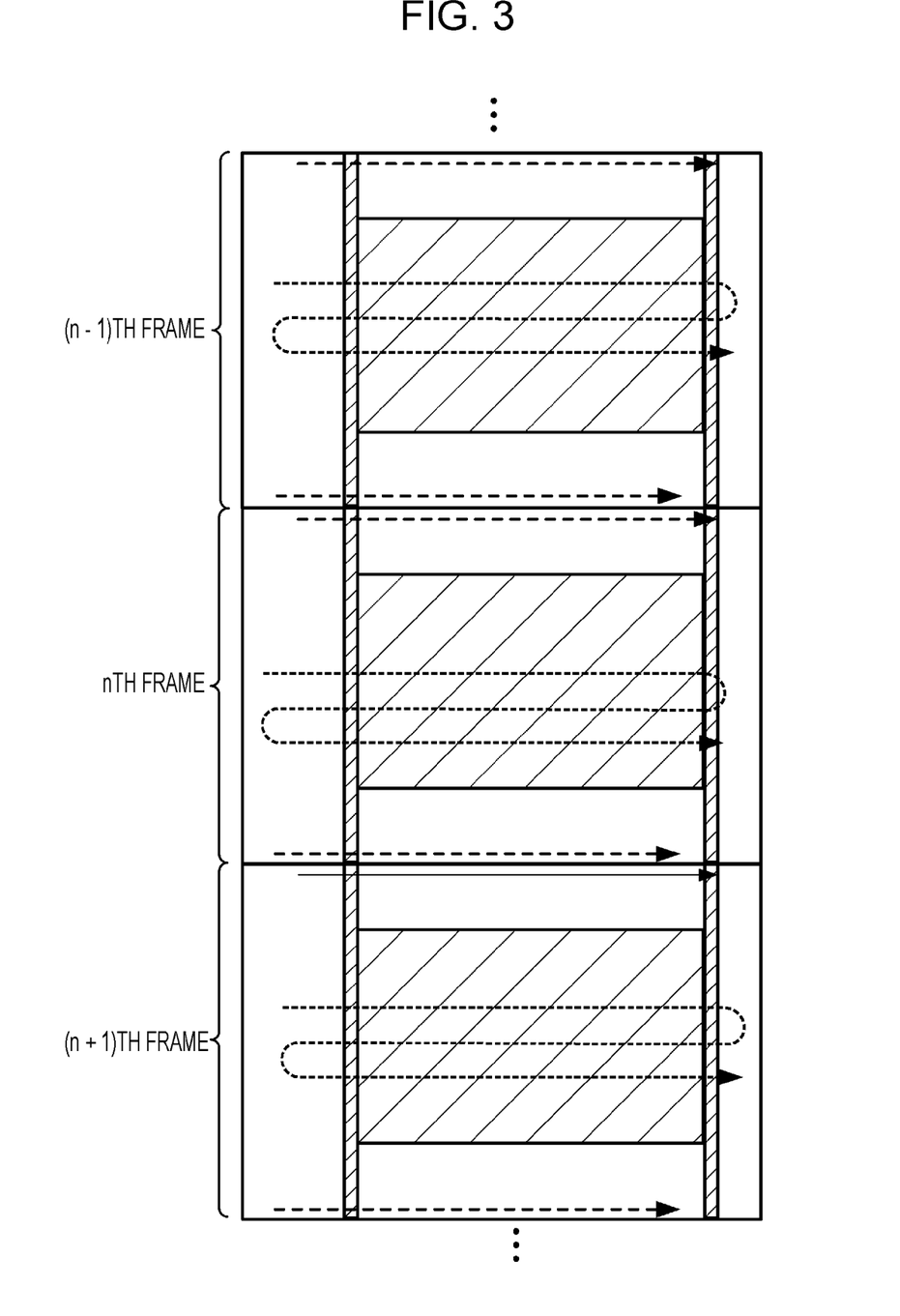
FIG. 3 is a diagram illustrating multiple pieces of image data generated by the imaging unit.

In the present exemplary embodiment, as illustrated in FIG. 3, multiple images are continuously captured by the imaging unit 105 and inputted to the transfer unit 104. When the interlace system is employed, image data of two consecutive frames (fields) corresponds to one image.

Figure 4:
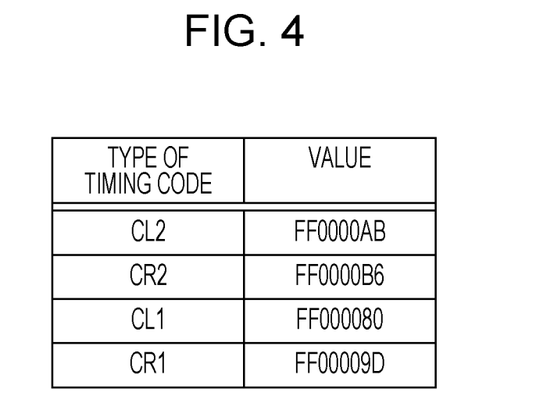
FIG. 4 is a diagram illustrating timing codes.

FIG. 4 is a diagram illustrating the types of the timing codes C and their values. Each of the timing codes CR1, CR2, CL1, and CL2 has a value different from another. Specifically, each of the timing codes CR1, CR2, CL1, and CL2 has a length of 4 bytes, starts with FF followed by three bytes which depend on the timing code type. The data in a data block De or Db does not start with FF. Therefore, it is possible to clearly distinguish a timing code C from a data block De or Db.

To output the image data D to another apparatus, data blocks are selected at predetermined timing in predetermined order for an array, and a signal sequence is generated and sequentially outputted. In the case of a data bus width of 8 bit, data outputted from the imaging unit 105 forms parallel digital data of 8 bit. An example of the order for an array may be as follows. A data block at the left-hand corner is first selected; data blocks are selected in the line direction one by one; and, when the data block at the right-hand corner has been selected, the data block at the left-hand corner in the next line and its subsequent data blocks are sequentially selected in the line direction. That is, data block P11, P12, . . . , P1N, P21, P22, . . . , P2N, . . . , PM1, PM2, . . . , PMN are sequentially captured in this order, and are arranged in this order so as to be outputted at predetermined timing. The predetermined timing is determined, for example, on the basis of a 27-MHz clock signal.

Figure 5:
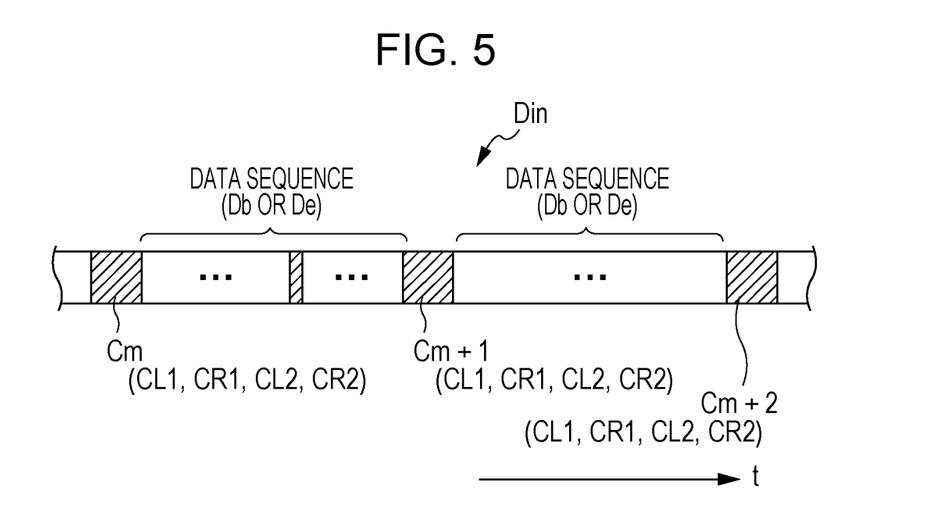
FIG. 5 is a diagram illustrating the data structure of a signal sequence received by an input unit.

FIG. 5 schematically illustrates an input signal Din thus generated. As illustrated in FIG. 5, timing codes C are embedded among data blocks Db or De according to the predetermined rule. The input unit 102 continuously receives the input signal Din, and captures data blocks one by one at the predetermined timing. More specifically, when signal degradation or an error does not occur, data captured by the transfer unit 104 is to accord with the rule of P11 . . . {CL2→Db→CR2}→{CL1→De→CR1}→{CL2→Db→CR2}→ . . . PMN (braces indicate repetition). Actually, adjacent data blocks are not continuous in terms of time, and a time interval of the integral-multiple of the clock is present between the blocks. However, such an interval is omitted for convenience of description.

The signal processing module 100 reads the rule in advance from the storage unit 106 before the processing is started. When a timing code C is detected, the signal processing module 100 determines the type of the timing code C, refers to the rule, and checks which part of the frame corresponds to the current capture timing. When the timing code C according to the rule is detected, the signal processing module 100 determines that no errors occur in the input signal Din (that a normal operation is being performed), and updates the current capture timing. When the detected timing code C does not accord with the rule (for example, two timing codes C of the same type are continuously detected, or a timing code CR2 is detected after detection of a timing code CR1), the signal processing module 100 determines that an anomaly occurs in the input signal Din (that a normal operation is not being performed, and that the correct capture timing is lost).

As illustrated in FIG. 5, even when the imaging unit 105 generates an input signal Din according to the predetermined rule and outputs it, the data received by the transfer unit 104 is not always the completely same as the input signal Din. For example, a noise may come in the signal in transmission from the imaging unit 105 to the transfer unit 104, and data received by the transfer unit 104 may be changed (degraded or lost). Such an adverse effect is noticeable when a cable connecting the imaging unit 105 to the transfer unit 104 is long. Even in the case where the signal degradation is serious, when the value of a data block De or Db is changed or wrongly recognized, only the image quality is degraded. However, when the value of a timing code C which is used to exert control of the signal processing module 100 is changed, the presence of the timing code C fails to be detected, and the data capture timing is lost. At that time, no normal operations may be performed, and no processable image data may be obtained. In this case, a regular capture timing need to be specified, and a normal operation needs to be recovered. The present exemplary embodiment is characterized by this recovery operation, and the recovery operation will be described in detail below.

Figure 6:
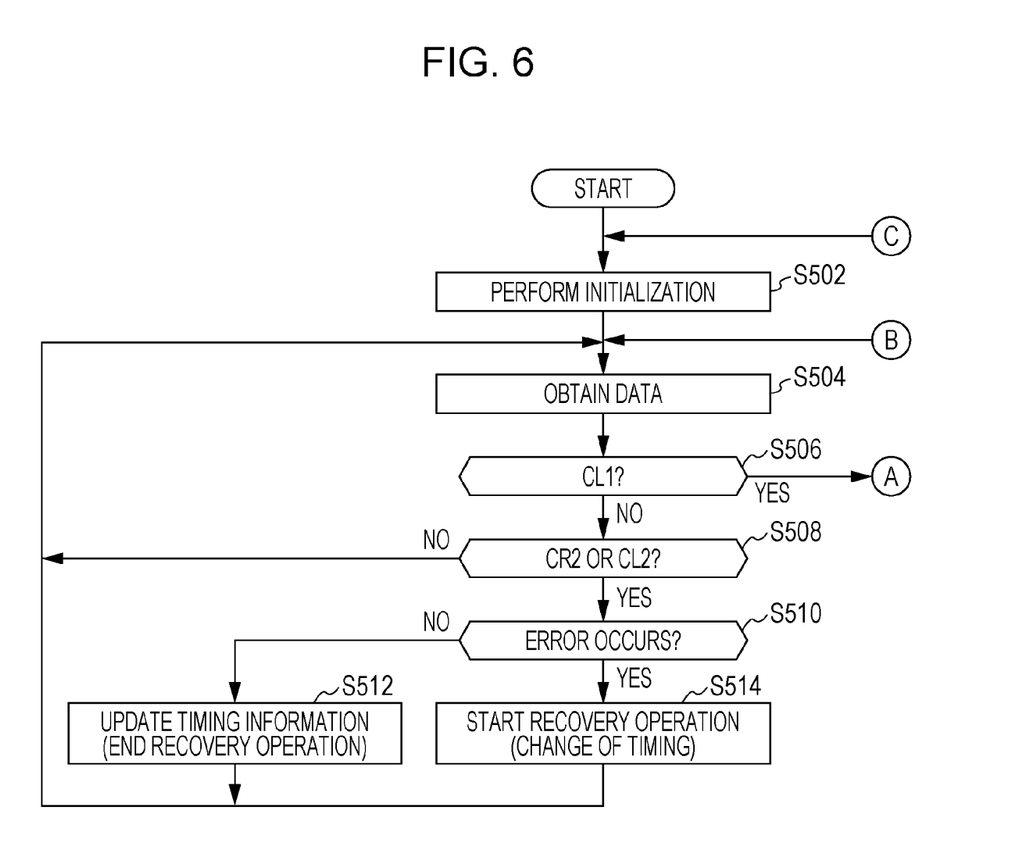
FIG. 6 is a flowchart of an exemplary operation performed by a signal processing module.

FIG. 6 illustrates an exemplary operation performed by the signal processing module 100. The imaging unit 105 operates independently of the signal processing module 100, and sequentially supplies the input signal Din to the input unit 102. When an operation of capturing an image is to be started, the signal processing module 100 performs initialization (S502). The initialization is a process of searching for the head position of any frame (or the timing corresponding to the head position) by supplying power (again), by activating programs (again), and by retrieving information, including the rule, about how to perform the processing from the storage unit 106. The initialization does not necessarily cause the data block P11 to be specified. At least the state in which the inputted timing is located in the portion before the first region A1 area in the frame (that is, a time point at which a data block De has not been captured in the frame) needs to be specified.

When the input unit 102 performs an input operation before the initialization, execution of the initialization causes the input operation to be interrupted. When information about the capture timing in one frame (hereinafter referred to as timing information) is stored in a memory in the input unit 102, the information is compulsorily discarded. As a result, at least a capture operation on the frame is not normally completed in this case. Information which is information other than the timing information and which is not related to the timing in one frame, for example, information for specifying a frame which is being processed, parameters such as the rule, and information necessary to search for the head of the frame after restart, may be stored. These pieces of information is effective even after the initialization.

Then, the input unit 102 obtains the next data block in the frame (S504). The detecting unit 103 determines whether or not the obtained data block corresponds to the timing code CL1 (S506). Specifically, the detecting unit 103 determines whether or not the 8-bit data value is equal to FF. If the value is not equal to FF, the detecting unit 103 determines that the data block does not correspond to the timing code CL1. If the value is equal to FF (that is, either one of the control codes), the detecting unit 103 obtains the next three bytes in sequence, and determines whether or not the data block corresponds to the timing code CL1.

If the data block does not correspond to the timing code CL1, the detecting unit 103 determines whether or not the data block corresponds to the timing code CR2 or the timing code CL2 (S508). If the data block does not correspond to one of the timing codes, the process returns back to S504, and the next data block is obtained. This process is repeated. If a timing code CR2 or a timing code CL2 is detected, the detecting unit 103 determines whether or not an error occurs on the basis of the detected timing code C (S510). More specifically, after a timing code CL2 (timing code CR2) is detected, when another timing code CL2 (timing code CR2) is detected without detecting a timing code CR2 (timing code CL2) (that is, in the case where two identical timing codes C are sequentially detected), the detecting unit 103 determines that an error occurs.

If an error occurs, a recovery operation is performed (S514). Specifically, the timing code C is regarded as not being received. The type of a timing code C which is predicted to be detected in a subsequent stage is specified on the basis of the timing code C which was detected in the operation determined to be normal just before detection of the erroneous timing code C. Then, processes from S504 to 508 are repeated. For example, after detection of the erroneous timing code C, if a timing code C is detected just after detection of other data (which should be a data block Db if the operation is normally performed) and if the detected timing code C is a timing code C of the same type as the predicted timing code C, it is determined that the operation returns back to normal. Alternatively, when a timing code CR2 whose data type is to be detected next after detection of the next data type according to the rule is detected, it may be determined that the operation returns back to normal. When it is determined that the operation returns back to normal, the timing information is rewritten so as to indicate that the current timing corresponds to the timing code CL2 (or the timing code CR2) (S512).

The recovery operation is performed when an error occurs only in the A2 area. The recovery operation is an operation of adjusting the timing by using information about timing for the frame which is being obtained, and is a process different from the initialization which is performed in S502 and which is an operation of discarding the stored timing information and adjusting the timing again for a new frame (more specifically, a frame received after the frame which is being obtained).

In the recovery operation, the next incoming data block is merely set so as to be processed, and the programs do not need to be restarted, or an operation of searching for the head of a frame does not need to be performed.

Several tens of lines are provided in the second region A2. In this case, unless multiple timing codes CL2 and CR2 are lost, even when a required time from error detection to completion of the recovery operation is equal to a time in which one or two lines are captured, a sufficient time may be provided to recover the operation to normal (that is, recover the lost timing) before a data block De is received. In addition, data in the A2 region is not stored. Even if an error occurs in a data block (if the operation is normally performed, Db) in a region near the position at which the above-described error is detected, the data block signal including a value which is not to be detected may hardly cause an adverse effect to be exerted on the operation of the image processing system 200 in a later stage.

Figure 7:
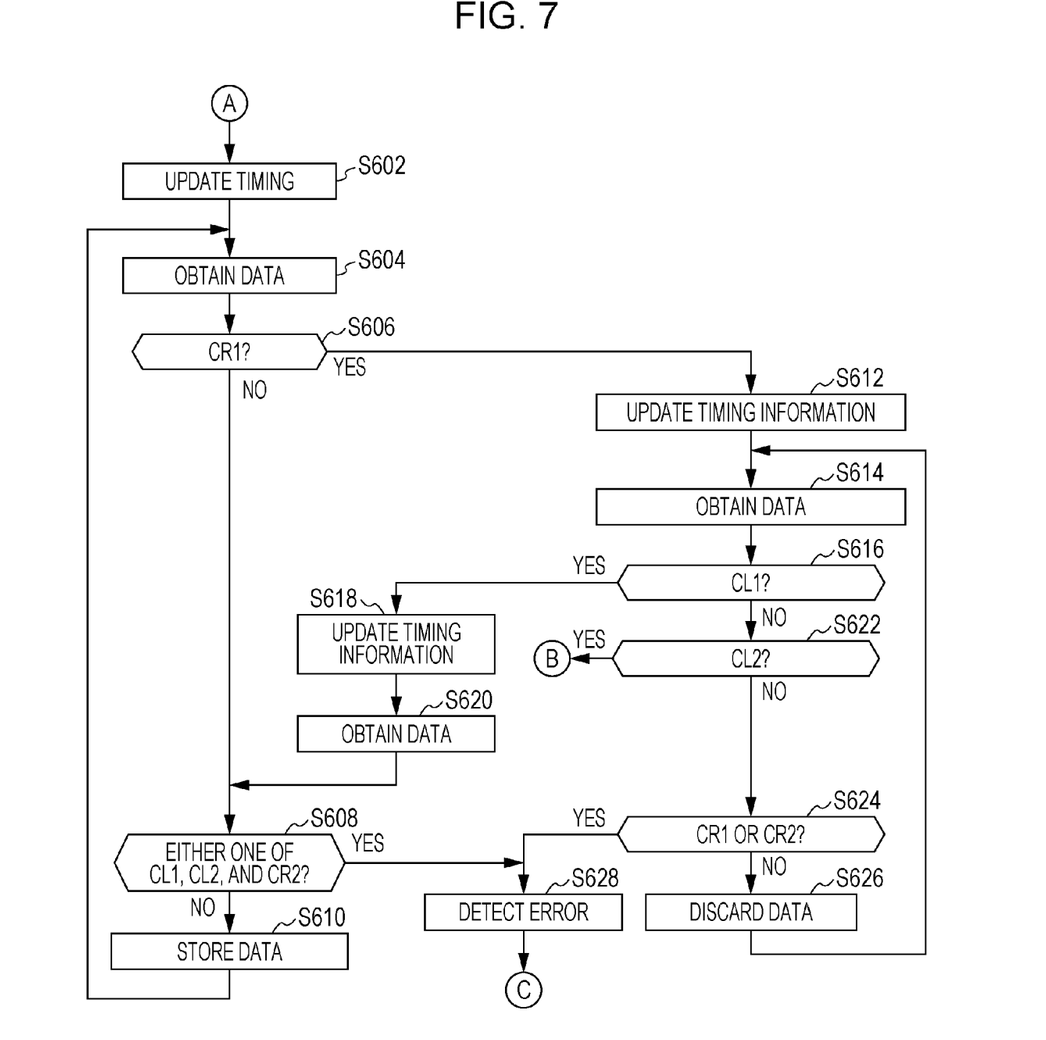
FIG. 7 is a flowchart of the exemplary operation performed by the signal processing module (continued)

The timing code CL1 detected in S506 indicates that the capture operation proceeds as far as a line in the first region A1. That is, after that, data blocks including data blocks De in the first region A1 are extracted (in FIG. 7). The process which is performed on lines in the first region A1 and which is illustrated in FIG. 7 is different from the process which is performed on lines in the second region A2 and which is illustrated in FIG. 6, in terms of storing of data and correction of an error which occurs.

First, the timing information is updated, and information indicating that the current capture position corresponds to the timing code CL1 is stored (S602). Then, the next data block is captured (S604). It is determined whether or not the captured data block corresponds to the timing code CR1 (S606). Then, it is determined whether or not the captured data block corresponds to either one of the timing codes CL1, CL2, and CLR2 (S608). If the data block corresponds to either one of the timing codes CL1, CL2, and CR2, it is determined that an error occurs at the position (timing) (S628). According to the rule, if there is a timing code C to be detected next after the timing code CL1, it should be the timing code CR1. Detection of a timing code C of another type against the rule indicates that any anomaly is present. Then, the process proceeds to S502 in FIG. 6, and the above-described initialization is performed (S502 in FIG. 6).

In S608, if the detected data block has a value other than the timing codes CL1, CL2, and CLR (if the operation is normally performed, the data block should be De), the value is stored (S610). After that, until a timing code CR1 is detected in S606, the processes from S604 to S610 are repeated. A timing code CR1 detected in S606 indicates that the data blocks De for one line in the first region A1 have been detected.

Then, the signal processing module 100 updates the timing information (S612), and captures data of the next data block (S614). It is determined whether or not the captured block corresponds to the timing code CL1 (S616). If the data block does not correspond to the timing code CL1, it is determined whether or not the data block corresponds to the timing code CL2 (S622). If the data block does not correspond to the timing code CL2, it is determined whether or not the data block corresponds to the timing code CR1 or CR2 (S624). According to the rule, if there is a timing code C to be detected next after the timing code CR1, it should be the timing code CL1 or CL2. Therefore, if the timing code CR1 or CR2 is detected after the timing code CR1, it is determined that an error occurs (S628). If the data block corresponds to neither the timing code CR1 nor CR2, the data block (if no anomalies are present, this region contains only data blocks Db) is not transferred and is discarded (S626).

Then, the signal processing module 100 captures the next data block (S614). The processes from S614 to S626 are repeated. A timing code CL1 detected in S616 indicates that the line in the first region A1 has been captured, and that the process proceeds to the next line in the first region A1. The signal processing module 100 updates the timing information (S618), and captures the next data block (S620). The process enters the process loop from S604 to S610 described above again.

A timing code CL2 detected in S622 after the timing code CR1 indicates that the last line in the first region A1 has been the target to be processed (that is, all of the processes for the first region A1 area have been completed). After that, a process similar to that in the second region A2 which is described in FIG. 6 is started. Thus, unlike a line in the second region A2, even when an error is detected in a line in the first region A1, the recovery operation is not performed, and the initialization is performed. As a result, after an error occurs, the data blocks in the frame are not processed.

The effect of the present exemplary embodiment will be described in comparison with an example of the related art.

In the related art, to avoid a misoperation based on an abnormal signal, in the case where an error is detected in image data for detecting an error, even when the error occurs in any region (timing), initialization (resetting) is performed. As a result, a certain time (for example, a time required for transmission of one frame or a longer time required for a capture operation) is required from occurrence of an error to completion of the reset operation and completion of resetting of the timing. Therefore, in the case where an error occurs at a position at which data which is not related to the data of a captured image is present, even when no errors occur in the frame after that, an image corresponding to the frame fails to be captured. As a result, the image obtained by reproducing the stored image data results in an image in which some frames are lost. In addition, when the processor processing a video signal also performs other functions, the reset operation temporarily produces a large load on the processor, which may exert an adverse effect on the operations for the other functions. This adverse effect is noticeable when the data needs to be processed in real time.

In contrast, according to the present exemplary embodiment, in one frame, when an error occurs at a timing of capturing data (data block Db) which is not data of a captured image, the initialization (resetting) is not performed, and the above-described recovery operation is performed. In contrast, when an error occurs in an operation of capturing a data block (De) which needs to be subjected to image transfer in the frame, the initialization is performed. That is, even for image data including an error, in the case where the image data is such that the error occurs in a line in the second region A2 and that the normal state comes back in a line in the first region A1, the resetting is not performed.

As a result, the number of performed initialization operations is reduced, and the load on the processor is thereby stabilized. Therefore, an inexpensive processor having low throughput may be used. Accordingly, the processor may easily have functions other than the above-described image capture function. Examples of the functions include an image forming function of processing obtained image data and performing an output operation such as printing. In addition, even when use of a cable or a camera which is not provided with sufficient measures against noise causes an occurrence rate of errors to be increased, the frequency of the initialization operations may be suppressed.

Even when the initialization is not performed on data containing such an error, data for the line containing the error is not stored. Therefore, it is impossible for such a stored signal to cause misoperations in a later stage.

Figure 8:
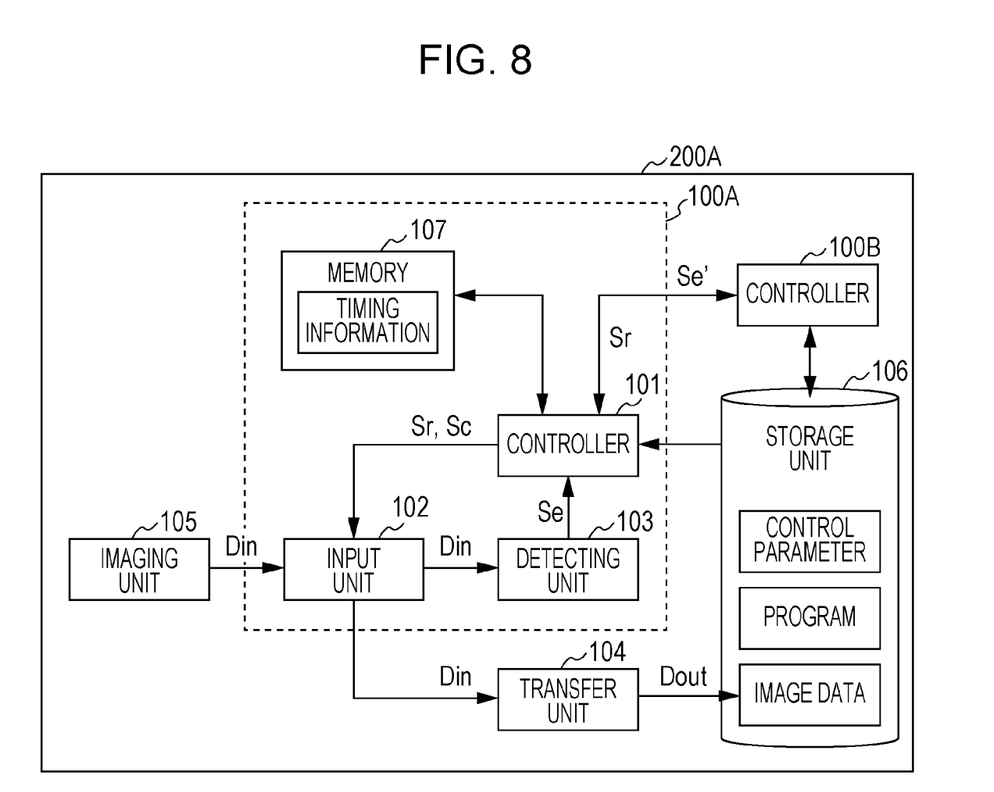
FIG. 8 is a diagram illustrating the functions of an image processing system.

For example, as an example in which a function other than the image capture function is provided, an image processing system 200A illustrated in FIG. 8 is constructed. The image processing system 200A uses a signal processing module 100A instead of the signal processing module 100, and includes a controller 100B. The controller 100B which is a processor has a function of exerting control for image formation other than control of the signal processing module 100A. The controller 100B monitors whether or not an error detection signal Se' is supplied from the signal processing module 100A. When an error detection signal Se' is detected, the controller 100B supplies a signal Sr to the controller 101, and also supplies parameters and the like which are required for the initialization to the controller 101 when necessary, achieving the above-described initialization.

In the signal processing module 100A, when a detected error requires the initialization to be performed, the controller 101 outputs an error detection signal Se' to the controller 100B. When the initialization does not need to be performed (that is, when the recovery operation needs to be performed), the controller 101 outputs no data to the controller 100B. When a signal Sr is received from the controller 100B, the controller 101 transfers it to the input unit 102. The other operations are similar to those of the signal processing module 100. That is, in the image processing system 200A, when the recovery operation needs to be performed, the signal processing module 100A takes measures within its module. When the initialization needs to be performed, the signal processing module 100A notifies the controller 100B, and performs the initialization on the basis of an instruction from the controller 100B. This configuration allows the load on the controller 100B not to be increased in the case where occurrence of an error is addressed in the recovery operation.

The exemplary embodiment is an example of the present invention, and modifications may be made from various viewpoints. The exemplary viewpoints of modification will be described below.

In the configuration of the above-described image data, the first region A1 and the second region A2 have any shape, any size, and any relative positions. For example, the shape of each region is not necessarily rectangular. The size of the second region A2 is desirably set on the basis of the time required for the initialization. Specifically, even when an error occurs in the second region A2, it is desirable that a time from occurrence of the error to start of capture of the first region A1 be sufficient. For example, if the time required for the initialization is equal to the time in which two or three lines are captured, several tens of lines are set in the second region A2 which is present on the upper side of the first region A1.

The method of determining an error depends not only on the order of the arrangement of timing codes C but also on the detection timing. For example, in addition to the types of the timing codes C and the order of arrangement of the timing codes C, the above-described rule includes the relative positional relationship of timing codes C (relative timing at which each timing code C is captured). Even in the case where the order accords with the rule, when the detection timing is too earlier or too later than the expected timing, it is determined that an error occurs. In short, in the image data D, it is only required that first data sections and second data sections be set in an input signal Din generated on the basis of the image data D, and that timing codes C be arranged so that it is possible to specify at least the type of the data section for a data block which is being captured.

Therefore, in the method of generating an input signal Din from the image data D, as described above, the read direction does not necessarily go from left to right, and from top to bottom. The arrangement, the types, and the information (values) of codes are not limited to those in FIG. 6. For example, the signals (the timing code CL2 and the timing code CR2) embedded in the area from the first line to the (a−1)th line (that is, an area which is in the second region A2 and which is present on the upper side of the first region A1) may be different from the timing codes C disposed in the area from the (a+1)th line to the Mth line (an area which is in the second region A2 and which is present on the lower side of the first region A1). Further, different timing codes C may be introduced to every line or every predetermined lines. This allows the capture timing to be accurately grasped. In short, it is only required that the line being currently processed be specified and that at least the type of a line, i.e., the first region A1 or the second region A2, be recognized.

Only data blocks disposed in the first region A1 are not necessarily set as data blocks to be transferred. For example, an area to be transferred and an area not to be transferred may be set in both of the first region A1 and second region A2. That is, the control operation performed when an error occurs may be defined independently of the transfer control operation.

The timing at which the initialization is performed may be a time point at which an error is detected two or more predetermined times in the same frame, instead of a time point at which an error is detected once.

In short, it is only required that the image processing method provided by the present invention include continuously inputting a signal sequence, the signal sequence including values of multiple pixels and control information, the pixels constituting an image, the control information being embedded at multiple positions according to a rule; detecting occurrence of an error on the basis of the inputted control information; and interrupting the input when the detected error is based on the control information embedded in a first region of the image, and continuing the input when the detected error is based on the control information embedded in a second region.

Even when an error is detected in the first region A1, the recovery operation may be exceptionally performed without the initialization. The target of the exception handling is, for example, the timing code CR1 in the last line in the first region A1. This is because capture of the first region A1 is substantially completed. Any area may be subjected to the exception handling.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image capturing apparatus comprising:
an input unit that continuously inputs a signal sequence, the signal sequence including values of a plurality of pixels and control information, the plurality of pixels constituting an image, the control information being embedded at a plurality of positions according to a rule;
a detecting unit that detects occurrence of an error on a basis of the inputted control information; and
a controller that interrupts the input performed by the input unit when the detected error is based on the control information embedded in a first region of the image, and that continues the input when the detected error is based on the control information embedded in a second region.

2. The image capturing apparatus according to claim 1, wherein when the input is interrupted, after a timing for processing is initialized, the controller restarts the input performed by the input unit, and when the input is continued, the controller adjusts the timing for processing on a basis of a control signal for the image, the control signal being inputted after the detection of the error, and stores data of the plurality of pixels constituting the image corresponding to the first region in a storage device in accordance with input order.

3. The image capturing apparatus according to claim 1, wherein the first region represents a first image captured by a photographing apparatus,
wherein the second region is constituted by pixels, each of the pixels having a predetermined value,
wherein the second region is set around the first region,
wherein the control information is disposed in a boundary portion between the first region and the second region, and
wherein the input unit obtains the image in order according to a pixel array.

4. The image capturing apparatus according to claim 2, wherein the first region represents a first image captured by a photographing apparatus,
wherein the second region is constituted by pixels, each of the pixels having a predetermined value,
wherein the second region is set around the first region,
wherein the control information is disposed in a boundary portion between the first region and the second region, and
wherein the input unit obtains the image in order according to a pixel array.

5. An image capturing method comprising:
continuously inputting a signal sequence, the signal sequence including values of a plurality of pixels and control information, the plurality of pixels constituting an image, the control information being embedded at a plurality of positions according to a rule;
detecting occurrence of an error on a basis of the inputted control information; and interrupting the input when the detected error is based on the control information embedded in a first region of the image, and continuing the input when the detected error is based on the control information embedded in a second region.

* * * * *